United States Patent [19]

Lagadec et al.

[11] Patent Number: 4,748,519
[45] Date of Patent: May 31, 1988

[54] METHOD AND APPARATUS FOR RECORDING AND REPRODUCING CODED DIGITAL SIGNALS

[75] Inventors: Roger Lagadec; Claudia Brandes, both of Rümlang, Switzerland; Yukio Fukuju, Yokohama, Japan

[73] Assignee: Willi Studer AG & Sony Corporation, Tokyo, Japan

[21] Appl. No.: 807,741

[22] Filed: Dec. 11, 1985

[30] Foreign Application Priority Data

Dec. 18, 1984 [CH] Switzerland .................. 05981/84

[51] Int. Cl.$^4$ .................................................. G11B 5/09
[52] U.S. Cl. ............................................ 360/48; 360/53
[58] Field of Search ............... 360/47, 48, 53; 371/39, 371/40; 364/59

[56] References Cited

U.S. PATENT DOCUMENTS

| | | | |
|---|---|---|---|
| 3,761,903 | 9/1973 | Bird Jr. et al. | 360/53 |
| 4,316,223 | 2/1982 | Baldwin et al. | 360/48 |
| 4,328,580 | 5/1982 | Stockham Jr. et al. | 360/47 |
| 4,393,502 | 7/1983 | Tanaka et al. | 371/40 |
| 4,506,306 | 3/1985 | Veillarb | 360/47 |

OTHER PUBLICATIONS

"A Design of Professional Digital Audio Recorder" by Doi et al., A.E.S. Preprint, 3/82.

Primary Examiner—Vincent P. Canney
Attorney, Agent, or Firm—Lewis H. Eslinger

[57] ABSTRACT

Methods and apparatus for recording and reproducing coded digital signals typically assign values of a signal to 2 categories which are separately coded, delayed differently, and subsequently recorded. In order to reduce the loss of such values in the cases of damage to the recording to the greatest possible extent, the values of the signals are coded at least twice in parallel and recorded onto several tracks. In one of the recordings, the sequence of values is modified in such a way that even major damage to the recording can be accommodated without producing non-correctable errors.

20 Claims, 8 Drawing Sheets

METHOD AND APPARATUS FOR RECORDING AND REPRODUCING CODED DIGITAL SIGNALS

FIELD OF THE INVENTION

This invention relates to a method for processing sequential values of a digital signal for its coded recording on a recording medium, in which the values are assigned to at least 2 different categories and the values assigned to different categories experience different relative delays, as well as a method for reproducing the coded digital signal, and finally an apparatus for processing the sequential values of a digital signal according to the method of this invention.

DESCRIPTION OF THE PRIOR ART

Digital signals are obtained by sampling values, for example the amplitude of an analog signal at given points in time. Those values are quantized, and are further used as data words of n bits word length. A so-called format defines a structure according to which those data words will be connected together, which is important for exchanging signals between machines. Such a format can, for example, define that the data words must be grouped into blocks, and that those blocks must also contain redundant data words for data protection.

Such a format can also specify the division of a sequence of data words from one channel onto several sequences for recording on a recording medium, as well as the rules for coding the data words.

Formats which are particularly well suited for recording on a recording medium define an assignment of the incoming data words to several categories. For example, in U.S. Pat. No. 4,393,502, incoming data words from a channel will be separated into odd and even data words and distributed to two parallel processing channels. The following processing of the data words on both parallel channels is identical. Data words from one processing channel (say, the even data words), however, experience a different delay from data words from the other processing channel. One of the advantages of such a formatting is apparent in the case of damage to the recording or the recording medium, particularly when the capability of the decoding circuitry for error correction has been exceeded. If the damaged zone does not extend along the recorded track beyond the distance mentioned as separating even and odd data words, only one of the data words categories will be affected locally by the damage. In the case of audio data, missing or erroneous data words coming from one of the processing channels can be replaced by interpolated values derived from the other processing channel. If, for example, there is a major data disruption caused by a fingerprint, two zones can be observed at reproduction. In the first zone, for example, most of the odd data words will be erroneous. In the second, most of the even data words will be erroneous. In the first zone, the erroneous samples can be replaced by data words obtained by interpolation from even data words. In the second zone, the erroneous samples can be replaced by data words interpolated from odd samples. In the case of recordings using tape as a recording medium, recordings are often combined by cutting and splicing. A particular type of error then occurs when interleaving is used for coding the data words. As a consequence of interleaving, data words which were originally consecutive are separated by relatively large distances, in which other data words are recorded. In the case of a tape cut, the sequence of the data words is corrupted, and so-called interleave errors occur. One result is that the redundant data words which were added to the original data words for their protection cannot fulfill this function anymore. This leads to uncorrectable errors at readout. In this case also, missing data words from one processing channel can be replaced by interpolated values from the other processing channel, and vice-versa. A crossfade of the audio signals from the one piece of tape to the other is also possible.

State-of-the-art codes for the recording of digital audio signals generally allow only a very limited protection of the data words against the effects of fingerprints, tape cuts etc.

In order to increase the reliability of digital recordings, it is usual to record the same signals more than once, using separate tracks. In this way, and because separate tracks only rarely exhibit coincident errors, a more reliable reproduction of the data can be obtained, by reproducing all the recorded signals and keeping only the data words which have been recognized as error-free.

The disadvantage of such recording methods is that erroneous or missing data words can only be retrieved from another track if the error patterns on the multiple recording tracks are not correlated or identical. This, however, is generally the case with errors caused by fingerprints, tape cuts etc., which always affect several or all tracks.

SUMMARY OF THE INVENTION

An object of this invention is to provide a method and an apparatus for the recording and reproduction of digital signals with which the loss of constitutent samples on the recording medium due to damages can be avoided to a further extent than before.

The advantages offered by the invention are to be seen principally in that greater damage to the recording medium can be tolerated than with previous protection methods without leading to uncorrectable errors. An important advantage is that missing or erroneous data words can be replaced by their true equivalents as recorded on other tracks. These data words are replicas of the correct ones, rather than more or less well approximated values derived by interpolation. This is particularly important and advantageous in the case of digital audio signals. Audio signals protected according to the invention allow the reproduction of the correct signal even in cases of fingerprints and mechanical cuts.

In the following, the invention will be outlined on the basis of illustrations relating to only one of several possible implementations.

DETAILED DESCRIPTION OF THE INVENTION

The description of the invention will be based on digital audio signals derived from an analog audio signal by sampling according to familiar techniques which need not be covered here.

Figure 1:
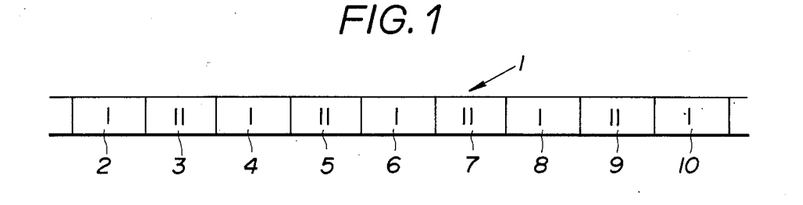
FIG. 1 shows a sequence of consecutive data words in natural order, represented schematically.
Figure 2:
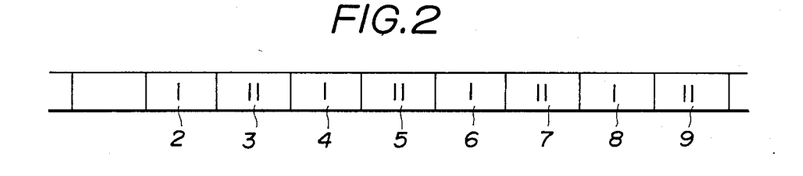
FIGS. 2 and 3 shows each a different sequence of data words according to FIG. 1.
Figure 3:
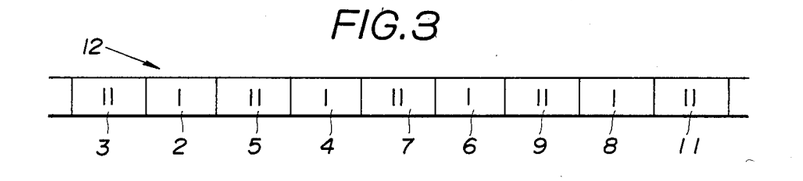

Thus, FIG. 1 shows a sequence 1 of values of data words 2 through 10 corresponding to consecutive samples of the audio signal. FIG. 2 shows the same values 2 through 9 of the sequence 1, in which the whole sequence is shifted in time and space by one value. This corresponds to a displacement by one sampling interval. FIG. 3 shows the same values 2 through 11 in a partly permuted sequence 12. This sequence 12 can be derived from the sequence 1 by permuting within pairs of consecutive values.

Figure 4:
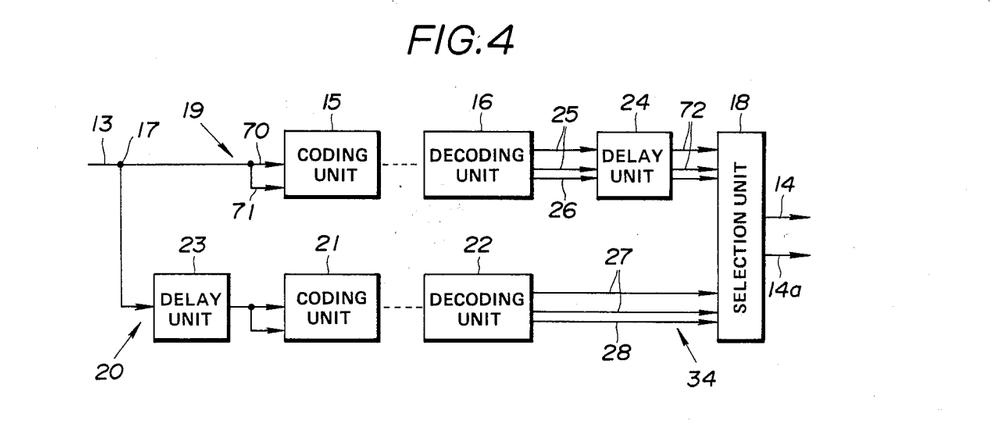
FIG. 4 shows an appratus for processing the data words.

FIG. 4 shows a recording channel 13 and a reproducing channel 14 of a state-of-the-art recording and reproducing machine, as for example a digital audio tape recorder. Such devices, have, as is well known, at least a coding unit 15 and decoding unit 16. Such units 15 and 16 can also be combined into a single unit for coding and decoding. Conceptually, coded data words are brought to a recording head, recorded onto the tape, read by a reproduce head, and brought to a decoding unit. Coding and decoding units generally consist of a storage circuit supplemented by ancillary circuitry such as address generators etc. The recording and reproducing channel 13, 14 is split, between a signal separating unit 17 and signal selection unit 18, into parallel processing channels 19 and 20. Channel 20 also has a coding unit 21 and a decoding unit 22, in the same way as channel 19. In channel 20, the coding unit is preceded by a delay unit 23. In channel 19, the decoding unit 16 is followed by a delay unit 24. The delay units 23 and 24 consist, for example, of a register or of memories. The decoding units 16 and 22 each have two outputs 25, 26 and 27, 28, respectively. Outputs 25 and 27 carry the acutal signals, while outputs 26 and 28 carry marking information which identify the data words on the outputs 25 and 27 as correct or erroneous.

Figure 5:
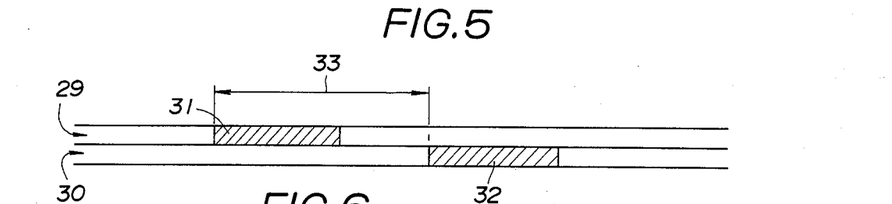
FIGS. 5, 6 and 7 show each a schematic representation of different processing channels.

FIG. 5 shows data words in two processing channels 29 and 30 as they can occur, for example, in the reproduction of decoded data words from a 2-track recording on magnetic tape. For illustration, we can assume that channel 29 contains only one category of data words, say the even samples, 2, 4, 6, 8, 10 of sequence 1, while channel 30 only contains the odd samples 1, 3, 5, 7, 9 of sequence 1. 31 and 32 represent two areas in which a majority of erroneous samples exist, as a result of a fingerprint or splice. As a consequence of the different delays in the processing channels 29 and 30, the areas 31 and 32 display a relative displacement 33. An error pattern according to FIG. 5 an be observed, for example, when a sequence 1 according to FIG. 1 is fed to both processing channels 19 and 20 (see FIG. 4), in the case where the circuit of FIG. 4 does not have delay units 23 and 24 and where the sequence 1 disrupted by damage to the recording medium is observed at a position 34.

Figure 6:
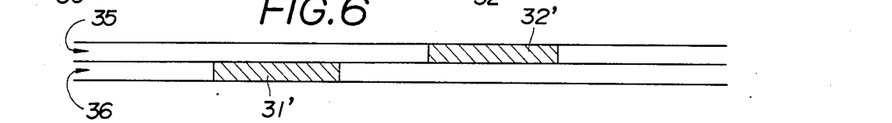

FIG. 6 represents data words on 2 processing channels 35 and 36 in a similar way to FIG. 5. The difference is that the sequence 1 feeds the circuit according to FIG. 4, in which the delay units 23 and 24 are in operation.

Figure 7:
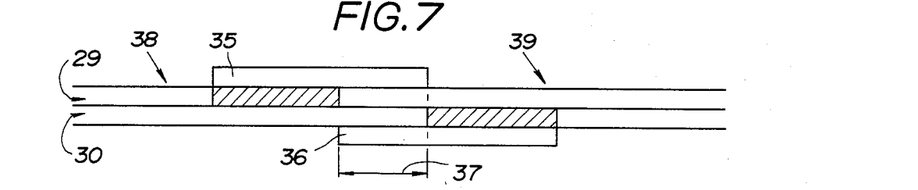

FIG. 7 is a combination of FIG. 5 and FIG. 6, and indicates in particular an area 37 in which a crossfade between two consecutive signals 38 and 39 can be implemented best.

Figure 8:
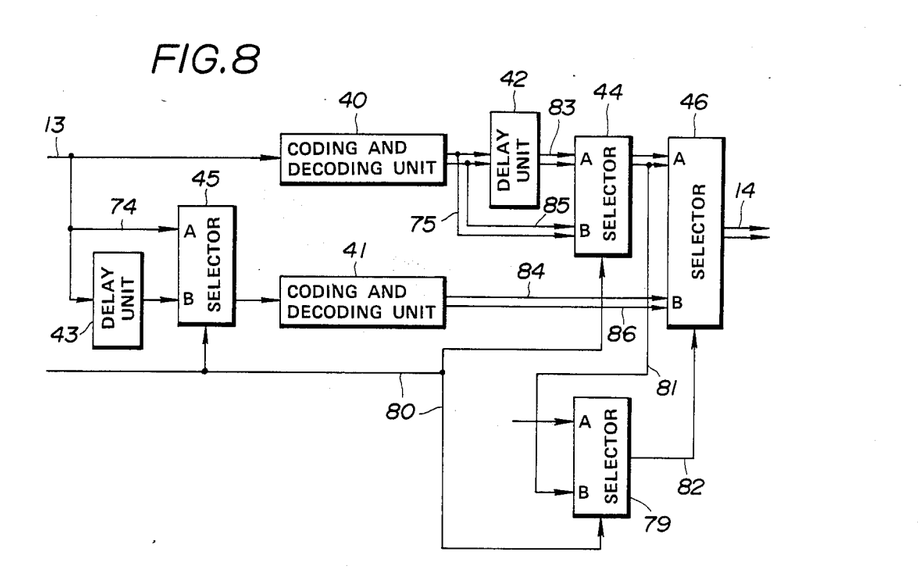
FIGS. 8, 9 and 10 shows each another implementation of an apparatus for processing the data words.

FIG. 8 shows an arrangement according to FIG. 4 in simplified representation with coding and decoding units 40 and 41, delay units 42 and 43, selectors 44 and 45 and a selector 46. Another selector 79 is connected via lines 80, 81 and 82 to the selectors 44, 45 and 46. Lines 83 and 84 transmit the data words from the coding and decoding units 40 and 41 to the selectors 44 and 46. Lines 85 and 86 transmit the word marks belonging to the data words.

Figure 9:
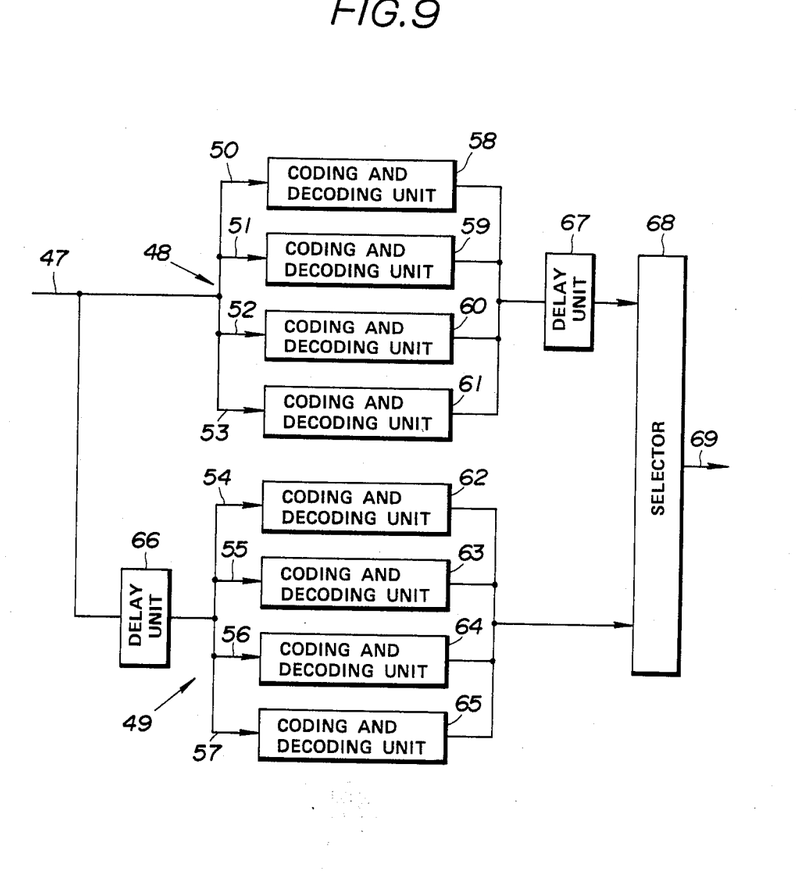

FIG. 9 shows a further implementation of this arrangement. An input channel 47 feeds data words to two main channels 48 and 49. There they are, in their turn, split into 4 channels 50 through 57, each one having a coding and decoding unit 58 through 65. In the main channel 49, a delay unit 66 precedes all channels 54 through 57, while in the main channel 48 a delay unit 67 is placed afer the channels 50 through 53. A selector 68 combines the main channels 48 and 49 to an output channel 69.

Figures 10, 14:
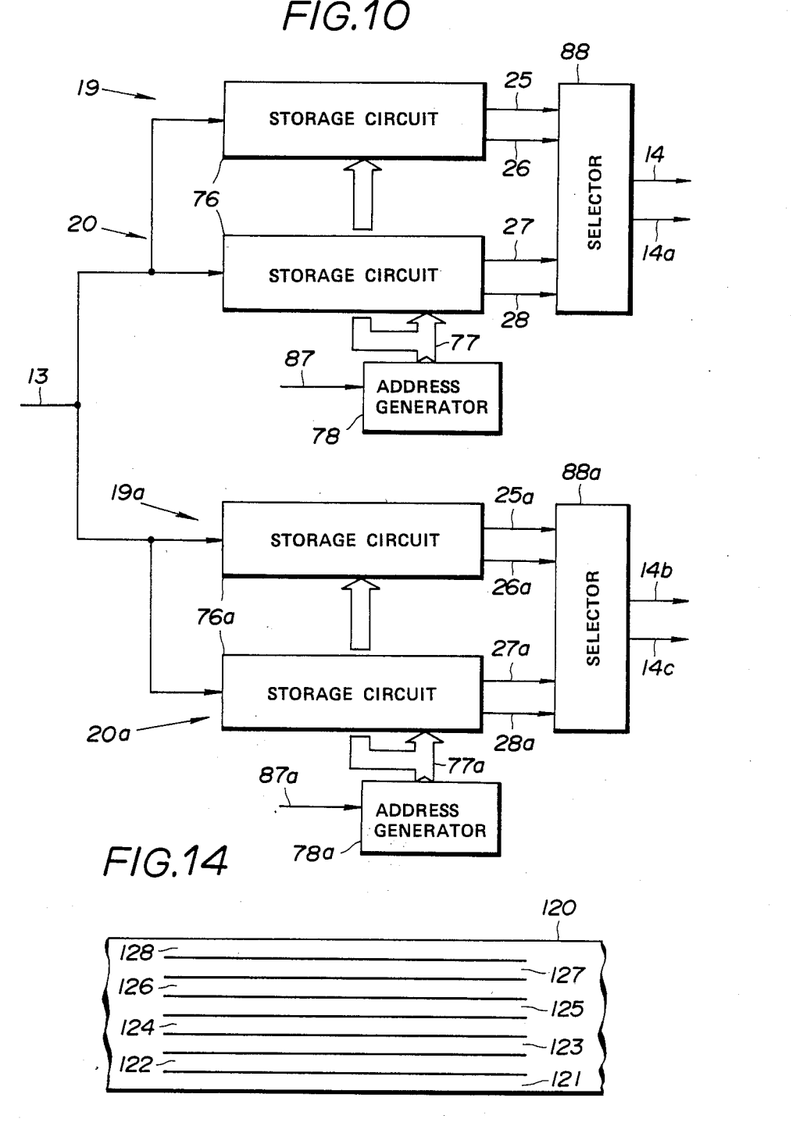
FIG. 14 shows part of a tape-based recording medium.

FIG. 10 shows another implementation of the apparatus according to the invention, with 4 parallel processing channels 19, 20, 19a and 20a. Each of these processing channels uses a storage circuit 76 or 76a, which is connected to the recording channel 13 as well as, via outputs 25, 27, 25a and 27a, to selectors 88 and 88a, respectively. Further outputs 26, 28, 26a and 28a carry data words markings. Selectors 88 and 88a also have outputs 14 and 14b for data words and 14a and 14c for data words markings. Two address generators 78 and 78a are also used, and are connected to the memories 76 and 76a via data busses 77 and 77a. Inputs 87 and 87a deliver timing signals to the address generators 78 and 78a.

Figure 11:
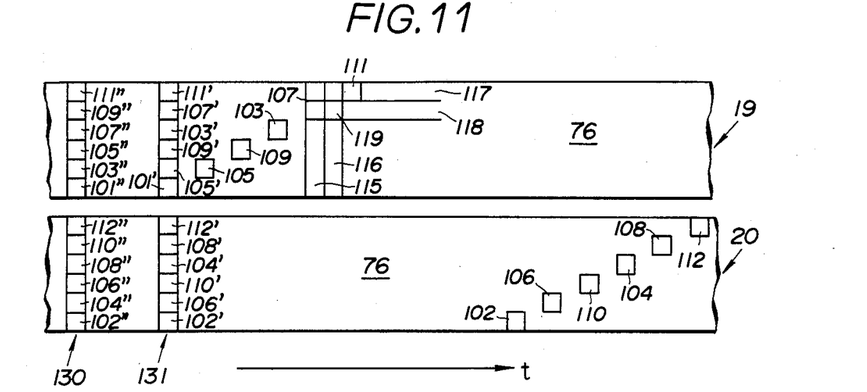
FIGS. 11, 12 and 13 show each a part of a mechanism for coding, represented schematically.

FIG. 11 shows schematically a part of storage circuit 76 of FIG. 10, in which well-known operations for coding the incoming data words blocks take place. Such storage circuits have an operation which can be described by a structure of columns and lines. Out of the totality of columns and lines, only two columns 115 and 116 and two lines 117 and 118 have been represented. Intersections of the columns and lines correspond to memory positions, of which only one memory position 119 at the intersection of column 116 and line 118 has been represented. Individual data words 101 through 112, 102' through 112' and 101'' through 112'' are represented at different positions of the storage circuit 76. The same also holds for FIGS. 12 and 13.

FIG. 14 shows part of a recorded tape 120 with tracks 121 through 128 for recording from different channels.

Figure 15:
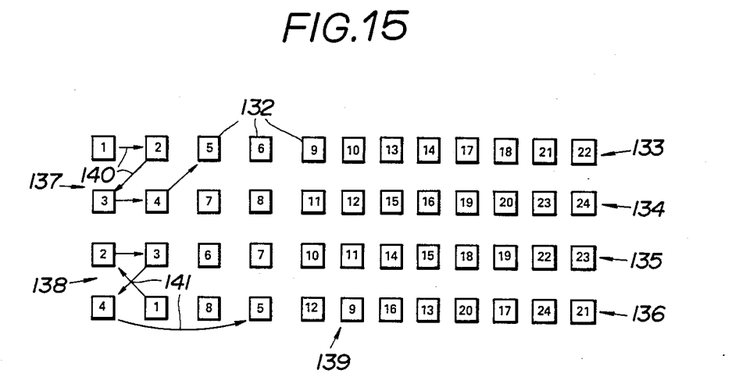
FIGS. 15 and 16 show sequences of data words from two channels and their arrangement (distribution) onto several tracks.

FIG. 15 shows data words 132 numbered 1 through 24 and data words 132 are, in this example, distributed onto 4 tracks 133 through 136. Two pairs of tracks 133, 134 and 135, 136 correspond, respectively, to two processing channels 137 and 138. The concept of a "track" is generally used in order to identify the area on which data are recorded at some distance from the edges of a recording medium. As long as the data are present within a device's processing circuitry, the concept of "channel" is preferably used. In order to avoid introducing the concept of "sub-channels", we shall speak here of "tracks", meaning that part of a channel which has been obtained from it by some splitting operation. This means that data words 132 of track 133 will later actually be recorded onto the same track of the recording medium. Twelve consecutive data words 132 on a track 133, 134, 135 or 136 correspond to a block 139. According to the well-known rules of the DASH format, a block 139 also contains redundant data words for protection, which need not be represented here. The arrows 140 and 141 indicate, in the case of the channels 137 and 138, according to which rule the data words in the tracks 133, 134, 135 and 136 must be ordered. The rules represented here correspond to the DASH-M version of the DASH format.

Figure 16:
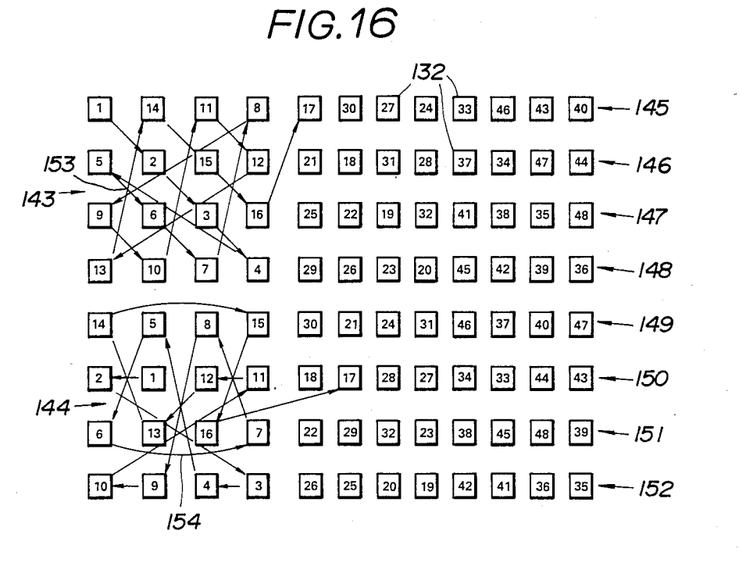

FIG. 16 shows an arrangement of data words 132 from 2 channels 143 and 144 onto twice 4 tracks 145 through 148 and 149 through 152. The data words 132 are numbered from 1 through 48. Again, the arrows 153 and 154 indicate according to which rule the data words 132 from each channel must be distributed onto the 4 tracks. Those rules are part of the DASH-S version of the DASH format.

Figure 17:
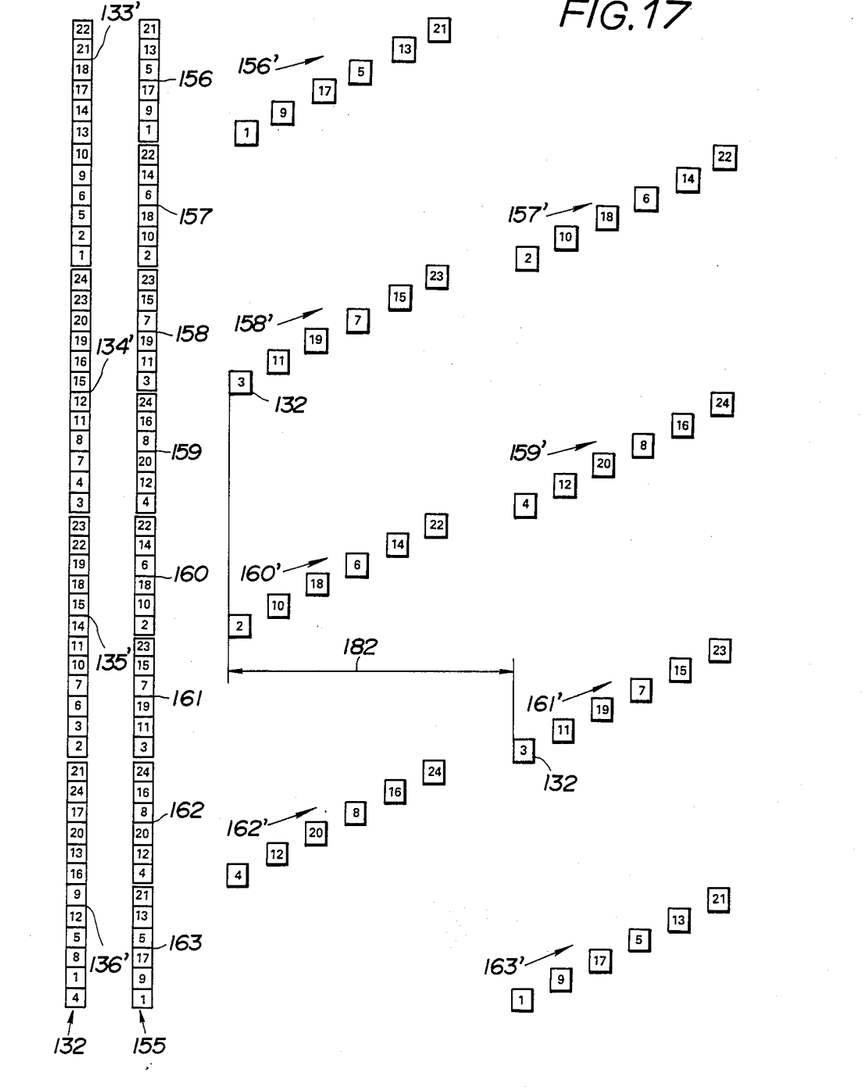
FIG. 17 shows schematical representation of the processing of data words in a coding unit.

FIG. 17 shows the same data words 132 from FIG. 15 schematically in their arrangement within a coding unit. Prior to the coding unit, they are processed serially, whereas the processing is parallel within the coding unit. The 12 data words 12 or the blocks 139 of each track of FIG. 15 are therefore represented by numbers 133', 134', 135' and 136'. At position 155, the even and odd data words 132 are represented as groups 156 through 163, and the actual sequence within the groups 156 through 163 has undergone a further permutation according to the coding rules of the DASH-M format. In the coding process, the data words experience different delays, so that they do not remain consecutive. They form groups 156' through 163', according to the interleave rules of the format.

Figure 18:
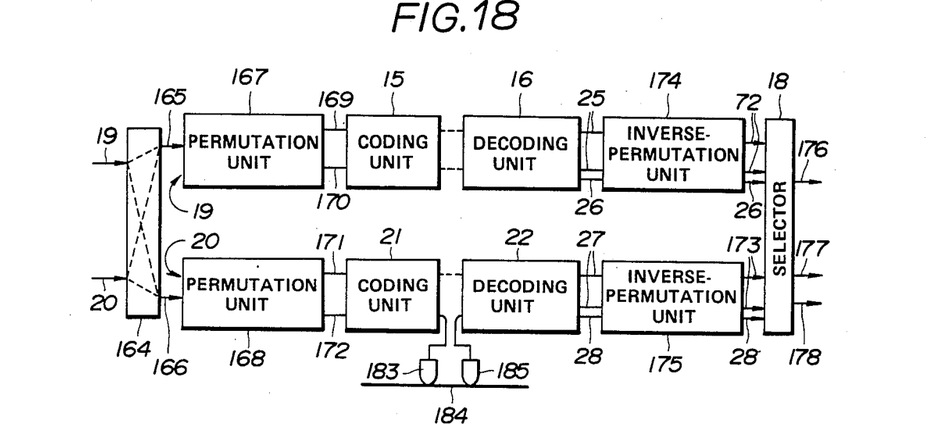
FIG. 18 shows a further implementation form of an apparatus according to the invention; and, FIGS. 19 and 20 show each a part of an apparatus according to the invention.

FIG. 18 shows an arrangement similar to that of FIG. 4. Therefore, identical blocks receive the same reference numbers and are not defined specifically again. Both channels 19 and 20 feed a distribution unit 164, which is connected via lines 165 and 166 with permutation units 167 and 168. Such permutation units are state of-the-art, and are already in use in digitally operating audio recorders. Lines 169, 170 and 171, 172 connect these with the coding units 15 and 21. Decoding units 16 and 22 are connected via lines 25 and 27 to inverse-permutation units 174 and 175, which in their turn are connected to selector 18 via lines 72 and 173. Lines 26 and 28 are used in a state-of-the-art way for transmitting the data words markings. The output of selector 18 are lines 176 and 177 for data words and 178 for data words markings.

Figure 19:
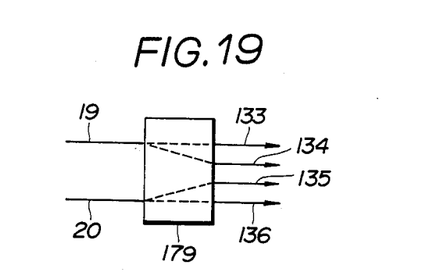

FIG. 19 shows schematically a matricing unit 179 which can split data words from channels 19 and 20 onto two channels or tracks each, numbered 133, 134 and 135, 136. Such matricing units are also well known, and consist essentially of a storage circuit and an address generator. This can be programmed in such a way that the desired splitting and permutation of the data words is achieved. Parts of the coding units 15 and 21 as well as the permutation units 167 and 168 and the distribution unit 164 for such a matricing unit 179.

Figure 20:
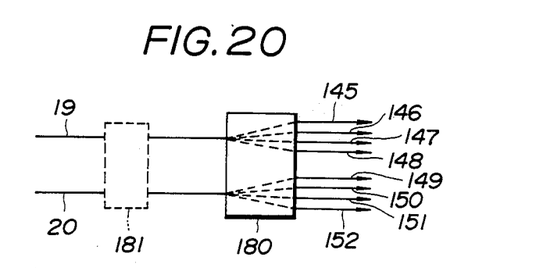

FIG. 20 shows a matricing unit 180, with which a distribution onto 8 tracks 145 through 152 can be achieved. It, as well as the matricing unit 179, can be preceded by a switching unit 181. The switching unit can combine channels 19 and 20 in such a way that the same data words appear on both channels. This means that all the data words of FIG. 15 and 16 carrying the same numbers will also carry the same value.

The method which is described here consists in feeding for example the same sequence 1 of data words two through 10 to 2 separate parallel channels. In one of the channels, the sequence will be coded without any modification. In the second channel, the sequence of the data words will be modified, so that a new sequence such as 2 or 3 will ensue. This modification can be, for example, that sequence 1 is delayed by one value, or that pairs of consecutive samples undergo a permutation. In the arrangement of FIG. 4, accordingly, the sequence 1 will feed recording channel 13 and be split into the 2 channels 19 and 20. In channel 19, sequence 1 will feed the coding unit 15, where even and odd samples will be processed separately, as implied by the two inputs 70 and 71. In channel 20, the sequence 1 will be for example shifted by one data words or sample in the delay unit 23, then delivered to the coding unit 21, in which it will be processed in the usual way. Let us assume that the recording medium has been damaged over an area less than the distance 33 defined by areas 31 and 32 in FIG. 5. The error pattern at output 72 of the delay unit 24 will be as shown in FIG. 5. At output 27 of the decoding unit 22, there is an error pattern according to FIG. 6. A comparison of these two error patterns show that the totality of the original data words is still reproduced. The missing data words of area 31 are to be found in channel 35, and the missing data words of area 32 in channel 36. This is also shown by FIG. 7. Corresponding areas 31' and 32' will be completed by data words from channels 30 and 29. In this way, no data words are missing. The erroneous data words of areas 31, 31' and 32, 32' are marked in the decoding units in a well known way, which means that data words markings will be delivered by the decoding units 16 and 22 together with the data words at outputs 26 and 28 and brought to selector 18. The selector selects valid data words and reconstructs, in a well known way, a complete sequence according to 1 at channel output 14. Data words carried by output channel 14 will also be accompanied by data words markings in a parallel output channel 14a. The arrangement according to FIG. 8 functions basically in the same way, with the difference that the selectors 44 and 45 can be used for eliminating the effect of the delay units 42 and 43. Via an electronic switch, a signal can be conveyed over line 80 to selectors 44, 45 and 79 and indicate whether the arrangement should process two separate signals present in time multiplex at input channel 13, or whether a single signal should be processed in the manner described in this invention. In the case of a double recording, the selectors 45 and 79 will be put in such a state by the signal on line 80 that they can receive signals over input B. Selector 44 will be switched to input A. In this state, selector 46 will be put in such a state by an output signal of selector 79 that it will create a sequence of output values for output channel 14 containing only valid data words from lines 83 and 84. Additionally, the data words markings on line 85 will be brought via line 81 to selector 79, which dictates the state of selector 46 between A and B according to whether a correct or an erroneous value has been identified by the corresponding data words marking. In the same way, the data words markings on line 86 can be observed. When recording 2 signals in time multiplex, selectors 45 and 79 will be switched in such a way that they can receive signals on their inputs A. Selector 44 will be switched to B. In this way, the delay units 42 and 43 will be bypassed via the inputs 74 and 75. At input A, selector 79 receives timing signals which control selector 6 via line 82 in such a way that both sequences are combined together.

An arrangement according to FIG. 9 will be chosen when the tape speed is low. In this arrangement, it is also possible to assign delay units to each processing channel rather than assigning one delay unit to all processing channels.

Instead of the delay of sequence 1 in one of the channels 19 and 20, a change of the sequence can be achieved, say by permutation by a change in the read and/or write addresses of a memory. As the coding units and the decoding units essentially consist of a storage circuit, this can happen in channel 20 by permuting the write addresses and reverse-permuting the read addresses. For this purpose, storage circuit 76 will be connected via a bus 77 to an address generator 78 containing the necessary sequences of addresses. Timing signals at input 87 control the address generator 78 accordingly. The data words permutation via permutation of the write addresses is illustrated schematically in FIG. 3.

Figure 12:
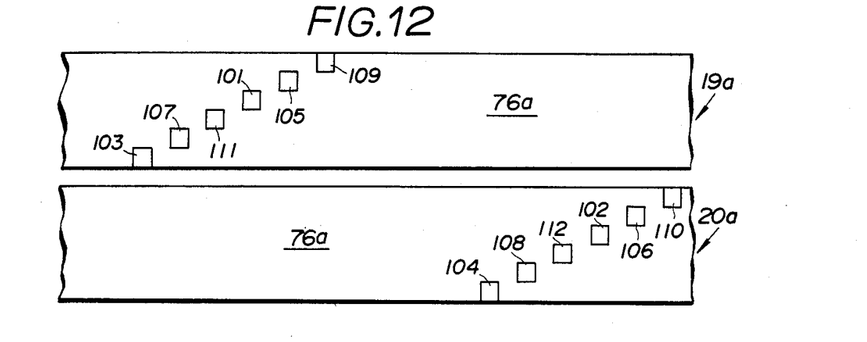
Figure 13:
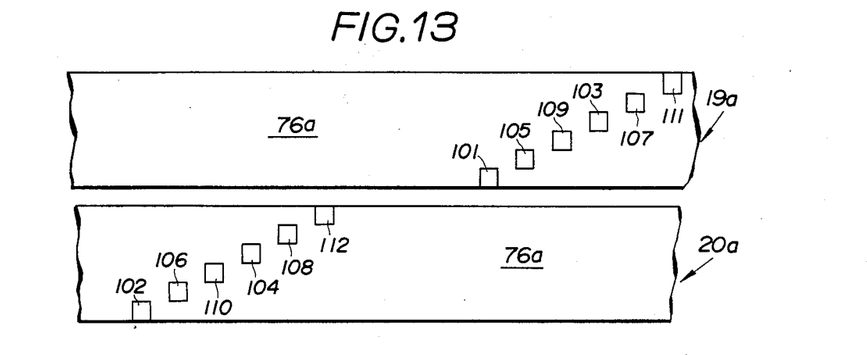

In order to describe the coding process according to the invention in some detail, let us assume that a sequence of 12 data words belonging to the same block is processed in recording channel 13. We are considering the data words 101 through 112 in FIGS. 11 through 13 which occur in recording channel 13 in the following ordering:

This sequence will be delivered to all storage circuits 76, 76a. In storage circuit 76 of channel 19, only odd data words will be processed, while only even data words will be processed in storage circuit 76 of channel 20. This is shown in FIG. 11. The same holds for storage circuit 76a, which processes only odd data words in channel 19a and only even data words in channel 20a. This is shown in FIGS. 12 and 13.

In storage circuit 76, serially entering data words will be processed blockwise in parallel, as indicated by the position 130 of storage circuit 76 in FIG. 11. In a so-called scrambling operation, data words at position 131 of storage circuit 76 will be written at new locations. leading to a new sequence, for example: 102′ 106′ 110′ 104′ 108′ 112′ 101′ 105′ 109′ 103′ 107′ 111′

Individual data words will be differently coded in a well known way during the coding process. This produces after the coding a distribution of the data words 101 through 112 in storage circuit 76 as illustrated in FIG. 11. For example, the even data words undergo more delay than the odd data words, as can be seen by reference to a time axis t.

FIG. 11 shows the relative position of the individual data words of a data block in channels 19 and 20. FIG. 12 and 13 show the data words 101 through 112 as coded in channels 19a and 20a. This means that in the multiple recording proposed here, the same data words are recorded once according to FIG. 11 and once according to, for example, FIG. 12 or FIG. 13. In the coding according to FIG. 12, the position of the individual data words will be permuted according to a selectable rule of ordering. This permutation within a block of data words, which can be seen from FIG. 11 and FIG. 12, has the effect that the same data words are not recorded simultaneously on the recording medium. For example, data word 109 will come out of the channel 19a later than it will come out of channel 19, etc.

If, during coding the doubly recorded data words 101 through 112 in channels 19a and 20a, the processing of odd and even data words is permuted, an arrangement of the data words 101 through 112 as seen in FIG. 13 results. In this process, two groups of data words are permuted. Identical data words from channels 19a and 20a are put further apart than data words from channels 19 and 20. Clearly, the combination of arrangements of the data words in FIG. 11 and 13 protects the data words more effectively in the case of damage to the recording than that of FIG. 11 and FIG. 12.

FIG. 14 shows further a particularly advantageous arrangement of two recording channels with four tracks each. Let us assume only that tracks 121 through 124, i.e. one half of the recording carry unmodified data words sequences, i.e. such ones according to FIG. 11. Tracks 125 through 128 carry a second recording according to FIG. 12 or FIG. 13, with permuted or delayed data. If one half of the tape recording 120 is damaged, the other half may still contain all the necessary data words.

In the case of an audio recording, the method proposed here is not restricted to the audio signals themselves, but can be recommended also for auxiliary signals. Such auxiliary signals have been described, for example, under the name of "Labels".

FIGS. 15 through 20 show how the method proposed here operates for data words 132 organised according to the DASH format. We shall assume that the data words 132 appear in their natural sequence in the channels 19 and 20 of the apparatus illustrated in FIG. 18 of FIGS. 19 and 20. In the case of distributing data words from channel 19 or 137 onto the individual tracks 133 and 134, the rules of DASH-M are used. The distribution occurs according to the arrows 140. The distribution of data words from channels 20 or 138 onto tracks 135 and 136 occurs according to arrows 141. The rules described here have the effects of breaking up the sequences in both tracks, and of ensuring that identical samples appear in the top tracks 133 and 134 of channel 137 and in the bottom tracks 135 and 136 of channel 138. This is particularly clear when comparing the data words 132 carrying the numbers 1 through 4 from channels 137 and 138. These operations take place in the distribution unit 164 and in the permutation units 167 and 168 or in the matricing unit 179.

After this, the data words 132 of tracks 133 and 134 are written via lines 169 and 170 into the coding unit 15, where they can be processed in parallel. There, they are also separated into categories (even or odd with respect to their relative position within the group), so that groups 156 through 159 can be formed. The same occurs with data words of tracks 135 and 136 which enter the coding unit 21 via lines 171 and 172 and form groups 160 through 163. In the coding units 19 and 21, all data words are delayed according to well-known rules, forming groups 156′ through 163′ which display different temporal and spatial distributions. At a later stage, the data words of groups 156′ and 157′, 158′ and 159′, 160′ and 161′, and 162′ and 163′ will be recorded on the same respective tracks. A comparison based on FIG. 15 of data words from different groups shows that they are offset temporally and spatially. This is the case, for example, for data word 132 with number 3, as illustrated by arrow 182. Groups 162' and 163' will be recorded with a record head 183 on one track of the recording medium 184 in the illustrated sequence. This also holds for the other groups 156' through 161' on other tracks. This illustrates that, if the same data word 132 is processed twice in two recording channels 19 and 20 or 137 and 138, in which the distribution of the data words onto the tracks and the permuted sequencing in tracks 133, 134, 135 and 136 are made according to the rules of DASH-M, then two versions of the same sample are recorded as far apart on the recording medium as possible, which reduces the risk of losing them both because of damage or errors.

In the case of signal reproduction, a reproduce head (illustrated in 185 for one track only) is used, and the same processing is used in reverse. In decoding units 16 and 22 and in inverse-permutation units 174 and 175, sequences of data words 132 are formed, as illustrated in FIG. 15. Possibly, some of the data words 132 are missing or erroneous, due to errors in recording or reproduction. Therefore, each of the data words 132 receives, in the decoding units 16 and 22, a marking. This means that in the decoding units 16 and 22, parallel to the registers for the data words, there is a register for the marking, which can be only for 1 bit, and indicates whether the data word 132 in the corresponding register is correct or not. This is done via checking methods which are well-known and unrelated to the invention.

The markings go through a processing path identical to that of the data words. Selector 18 can detect, on the basis of the markings, whether a given data word is correct or not. In a double recording of a signal over 2 parallel channels 19 and 20, each data word occurs twice, and selector 18 can reconstruct a sequence of data words which is composed as far as possible of correct data words.

In order to split data words from 2 channels 143 and 144 onto 4 tracks each (145 through 148 and 149 through 152), as seen from FIG. 16, it is necessary to use an arrangement basically similar to that of FIG. 18. The difference is that, after the distribution unit 164, 4 identical channels instead of 2 will follow. The operation of this arrangement, however, is identical, and need not be repeated here. In this case also, identical data words 132 will be recorded twice, though not necessarily twice on the same pair of tracks. This is illustrated in one case by the data words with numbers 1, 14, 5 and 2 in FIG. 16.

Matricing units 179 and 180, preceded by a switching unit 181, can operate with one single unit programmed for given rules of distribution and permutation of data words, and operate selectably for the single recording of 2 different data signals in time multiplex onto 2 or 4 tracks, or for the double recording of one data signal, all within the same format. Clearly, the number of tracks of 2 or 4 indicated here are only illustrative examples. As the DASH format is based on numbers of tracks per audio channel which are powers of 2 (1, 2 or 4), the invention and apparatus presented here can be applied without difficulty.

We claim:

1. Method for processing sequential values of a digital signal for its coded recording on a recording medium, in which the values are assigned during coding to at least two different categories which correspond to even values and odd values of the digital signal, and in which the values belonging to different categories experience different delays, characterized by processing the values in a plurality of parallel channels according to the number of categories, and by imposing a predetermined different sequencing of said even values and said odd values in one channel with respect to the other channel.

2. Method for reproducing a coded digital signal recorded according to claim 1, in which, during a decoding process, the values belonging to different categories which correspond to even values and odd values experience different delays compensating those introduced in coding, characterized by a modification in the sequencing of the values in one channel with respect to the ohter channel, and by merging the most appropriate values from all channels into a sequence of consecutive values.

3. Method according to claim 1 or 2, characterized in that the modification in the sequencing of values is achieved by a permutation of values within a given group of the values.

4. Method according to claim 1 or 2, characterized in that the modification of the sequence of values occurs via modification of read or write addresses for a storage circuit.

5. Method according to claim 1 or 2, characterized in that the modification in sequence occurs via permutation of two groups of values.

6. Method according to claims 1 or 2, characterized in that the modification in the sequence of values occurs via temporal delay of the values of at least one channel by a time interval corresponding to one sampling interval.

7. Method according to claims 1 or 2, characterized in that the modification in the sequence of values occurs via temporal delay of the values of individual tracks of a channel.

8. Method according to claim 1, in which the values are recorded onto several tracks of a recording medium, characterized in that two groups of tracks are formed on the recording medium, where one set of tracks contains permuted or delayed tracks and the other set of tracks contains values without permutation or delay.

9. Method according to claim 2, characterized in that the merging of the most appropriate values from all channels to a sequence of output values occurs based on the use of markings.

10. Method according to claim 1, in which values are assigned to two categories during the coding process, characterized in that all values of a digital signal are processed on two channels, in that the values in each channel are distributed onto $2^k$ tracks, in that number k is a non-negative integer, in that the modification of the sequence of values occurs via permutation of the sequence in one channel, and in that, with an identically defined sequence of corresponding tracks in both channels, identical values in both channels will be processed in both channels in different tracks in the mentioned sequence.

11. Method according to claim 1, in which the values of the digital signal are recorded according to a known format referred to as "DASH" and in which the values belonging to both categories are assigned to groups, characterized in that the processing of values occurs in two parallel channels and that the modification in the sequence of values occurs via permuting the temporal sequence of the groups in one channel.

12. Method according to claim 11, characterized in that each input channel is split into two tracks.

13. Method according to claim 11, characterized in that each input channel is split into four tracks.

14. Method according to claim 11, 12 or 13, characterized in that an additional permutation of values between the tracks of the one channel occurs with respect to the tracks of the other channel.

15. Method according to claim 11, characterized in that the values of the digital signal from two channels are recorded onto four tracks.

16. Method according to claim 11, characterized in that the values of a digital signal from two channels are recorded onto eight tracks.

17. Apparatus for processing sequences of values of a digital signal for its coded recording on a recording medium and its decoded reproduction from the recording medium, characterized by an arrangement for transmitting a first signal from an input channel onto a plurality of channels, by an arrangement for merging the values to an output channel, and by an arrangement for modifying the sequence of values in one channel with respect to the sequence of values in another channel.

18. Apparatus according claim 17, characterized in that the arrangement for modifying the sequence of values of a signal is implemented within an arrangement for coding and decoding, composed of a storage circuit with an address generator.

19. Apparatus according to claim 17, in which an input channel and an output channel are split onto two main channels with several channels, characterized in that an arrangement for modifying the sequence of values is assigned to each main channel.

20. Apparatus according to claim 17, characterized by a selector assigned to each coding and decoding unit, by a common selector following the decoding units and by a further selector controlling the common selector in such a way, that in function of an external signal the operation can be selected between recording and reproducing the same values with different sequences, and alternately recording and reproducing values of a plurality of signals with the same sequences of values.

* * * * *

UNITED STATES PATENT AND TRADEMARK OFFICE
CERTIFICATE OF CORRECTION

PATENT NO. : 4,748,519
DATED : May 31, 1988
INVENTOR(S) : Roger Lagadec et al.

It is certified that error appears in the above-identified patent and that said Letters Patent is hereby corrected as shown below:

Column 2, line 37, change "constitutent" to --constituent--;

line 61, change "shows" to --show--.

Column 3, line 35, after "devices" delete ",";

line 44, change "separating" to --separation--.

Column 4, line 32, change "afer" to --after--.

Column 5, line 34, change "12" second occurence to --132--.

Column 7, line 38, after "ordering: insert -- 101 102 103 104 105 106 107 108 109 110 111 112 --;

line 51, change "." to --,--.

Column 10, line 14, change "ohter" to --other--.

Signed and Sealed this

Tenth Day of January, 1989

Attest:

DONALD J. QUIGG

Attesting Officer

Commissioner of Patents and Trademarks